A. NYE, Jr.
FEED-BAGS FOR HORSES.
No. 169,726.  Patented Nov. 9, 1875.
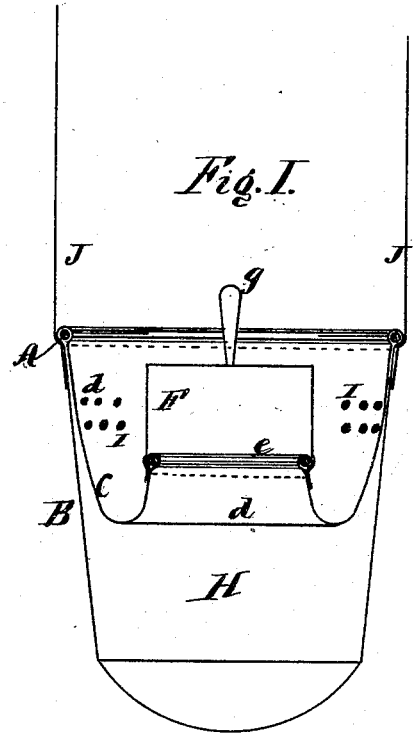
Fig. I.
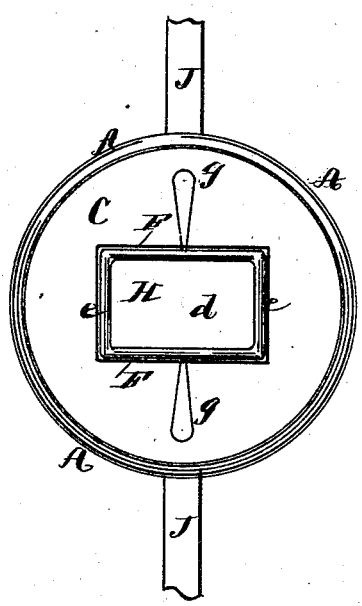
Fig. II.
Witnesses:
Franklin Barritt
Richard Gerner
Inventor:
Asa Nye, Jr.
Per:
Henry Gerner,
Att'y.

UNITED STATES PATENT OFFICE.

ASA NYE, JR., OF BOSTON, MASSACHUSETTS.

IMPROVEMENT IN FEED-BAGS FOR HORSES.

Specification forming part of Letters Patent No. 169,726, dated November 9, 1875; application filed April 29, 1875.

*To all whom it may concern:*

Be it known that I, ASA NYE, Jr., of Boston, in the county of Suffolk, State of Massachusetts, have invented certain Improvements in Feed-Bags for Horses, of which the following is a specification:

The object of my invention is to produce a feed-bag for horses, which contains the food in a separate receptacle in such a manner that the horse can only get at the required quantity of food as he feeds, without heating the food, and without being subject to suffer from imperfect ventilation.

My invention consists in constructing a telescopic feed-bag to a metallic ring, of suitable size to allow the horse to put his head into the same, and give plenty of space around to allow the air to enter. An ordinarily-constructed feed-bag, which is provided with holes for ventilation in the middle or thereabout, is attached to the head of the horse by aid of an elastic string. To the inside of the above-mentioned metallic ring 1 fasten a shorter feed-bag, narrower than the outer one. I also perforate this interior feed-bag with air-holes. I prefer to use eyelets for forming these holes in both bags, in such a manner that metallic eyelets are pierced through both bags, and then clinched together. In the bottom of the inner bag an oval hole is cut, of a size only sufficient to allow the horse to put his lips through the same. This hole is formed and held in exact shape by a metallic oval ring, which is fastened to the material forming the edges of the hole. Around this hole is attached to the upper part of the bag a sack, which is provided with loops at the top, in order to be able to shut the mouth of the sack when the feed-bag is not in use.

When in use, and attached to the horse's head, the sack is turned down over the ring, so as not to hinder the horse in the act of feeding. When the feed is placed into the receptacle formed between the two bags the inner or telescopic bag is lifted up, and the feed is poured in through the sack in sufficient quantity to reach up under the oval ring at the bottom. The sack is then folded down over the oval ring, and the feed-bag is attached to the head of the horse. It will readily be understood that the horse then feeds through the hole bordered by the oval ring, and can only gradually eat from the top of the feed as he eats the same away, and as the telescopic bag descends.

In the drawing, Figure I is a sectional elevation of my improved telescopic feed-bag, and Fig. II is a plan view of the same.

A is the metallic ring fastened to the top of the outside bag B. C is the telescopic inner and smaller feed-bag, with hole $d$ in the bottom, bordered by the oval ring $e$, and also attached at the top to the ring A. F is the sack, fastened around the ring $e$, and provided with loops $g\ g$. H is the receptacle for the feed, between the bags B and C. I I are the air-holes in the bags B and C. J is the elastic string by which the bag is held to the horse's head.

Having thus described my invention, I desire to claim—

The telescopic bag C, with oval hole $d$, ring $e$, and sack F, with loops $g\ g$, in combination with sack B, ring A, air-holes I, and elastic string J, substantially as described.

This specification signed this 13th day of April, 1875.

ASA NYE, JR.

Witnesses:
 GEO. H. WELLS,
 JOHN D. PARKER.